(12) United States Patent
Massara et al.

(10) Patent No.: US 6,431,645 B2
(45) Date of Patent: Aug. 13, 2002

(54) STOWABLE REAR SEAT TRAY TABLE

(75) Inventors: Andrew J. Massara, Birmingham; Douglas Jablonski, Westland; Mark A. Folkert, Farmington Hills; Donald A. Lux, Sterling Heights, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/775,789

(22) Filed: Feb. 1, 2001

Related U.S. Application Data

(60) Provisional application No. 60/179,875, filed on Feb. 2, 2000.

(51) Int. Cl.[7] .............................................. A47B 83/02
(52) U.S. Cl. ...................... 297/144; 297/173; 297/174; 297/467; 296/63
(58) Field of Search ................................ 297/135, 150, 297/152, 154, 157.1, 158.2, 118, 119, 120, 144, 467, 173, 174, 188.08, 188.01; 296/63, 37.15

(56) References Cited

U.S. PATENT DOCUMENTS

| 916,631 | A | * | 3/1909 | Towne | 297/120 X |
|---|---|---|---|---|---|
| 1,178,749 | A | * | 4/1916 | Petrow | 297/144 |
| 2,125,920 | A | * | 8/1938 | Hayden | 297/135 X |
| 2,274,506 | A | * | 2/1942 | Streit | 297/144 |
| 2,375,696 | A | * | 5/1945 | Shick | 297/188.01 |
| 2,582,703 | A | * | 1/1952 | Kirshbaum | 297/144 |
| 3,206,775 | A | * | 9/1965 | Filson | 297/118 X |
| 3,309,135 | A | * | 3/1967 | Jannetto | 297/188.01 |
| 3,717,375 | A | * | 2/1973 | Slobodan | 297/154 X |
| 4,834,449 | A | * | 5/1989 | Engelman | 297/150 X |
| 5,035,464 | A | * | 7/1991 | Spallholtz | 297/144 |
| 5,129,702 | A | * | 7/1992 | Ervin | 297/144 |
| 5,489,054 | A | | 2/1996 | Schiff | |
| 5,547,247 | A | * | 8/1996 | Dixon | 297/150 X |
| 6,033,014 | A | * | 3/2000 | Nightengale | 297/174 |

* cited by examiner

Primary Examiner—Stephen T. Gordon
Assistant Examiner—Patricia Engle
(74) Attorney, Agent, or Firm—Brooks & Kushman, P.C.

(57) ABSTRACT

A vehicle seat assembly includes a rear seat having a recess formed at a forward side thereof and a tray housing positioned in the recess. A foldable tray is positioned in the housing and movable between a stowed position within the housing and a deployed position for use. The tray and tray housing are configured such that in the stowed position the tray and housing are disposed within the seat recess below the knees of a passenger seated thereon such that it does not interfere with passenger knee space.

10 Claims, 2 Drawing Sheets

STOWABLE REAR SEAT TRAY TABLE

CROSS-REFERENCE TO RELATED APPLICATIONS

This application claims priority to U.S. provisional application Ser. No. 60/179,875 filed Feb. 2, 2000.

BACKGROUND OF THE INVENTION

1. Field of the Invention

The present invention relates to a stowable rear seat tray table which is collapsible into a recess formed on a forward side of a rear seat assembly without reducing available knee space in the passenger compartment.

2. Background Art

Modern vehicle interior designs are configured to provide multiple convenience accessories, such as cup holders and trays. The continuing challenge for vehicle interior designers is to provide such features in a manner which does not compromise available vehicle interior space for vehicle occupants and does not adversely affect aesthetics in the vehicle.

Accordingly, it is desirable to provide a rear tray assembly for rear seat occupants in a manner which does not compromise usable space and does not adversely effect vehicle interior aesthetics. Prior art exists in which rear seat trays are positioned on the back of the front seat and extendable to a flat deployed position, such as in an aircraft seat. However, such structures may be unsightly in a vehicle interior, and may require a large tray assembly so that the tray may extend from the front seat over the knees of the seated rear passenger.

SUMMARY OF THE INVENTION

The present invention provides a vehicle seat assembly including a stowable rear seat tray which is housed within a recess formed at a forward side of the seat without reducing available knee space in the passenger compartment. Specifically, the rear seat tray assembly is positioned in a recess which is formed along the front of the lower seat and the tray assembly extends to the vehicle floor.

More specifically, the present invention provides a vehicle seat assembly including a rear seat having a recess formed at a forward side thereof, and a tray housing positioned in the recess. A foldable tray is positioned in the housing and movable between a stowed position within the housing and a deployed position for use. The tray and tray housing are configured such that in the stowed position the tray and housing are disposed within the seat recess below the knees of a passenger seated thereon such that the tray does not interfere with passenger knee space.

Accordingly, an object of the invention is to provide a stowable seat tray for rear seat passengers which does not interfere with seating space or knee space for rear passengers.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
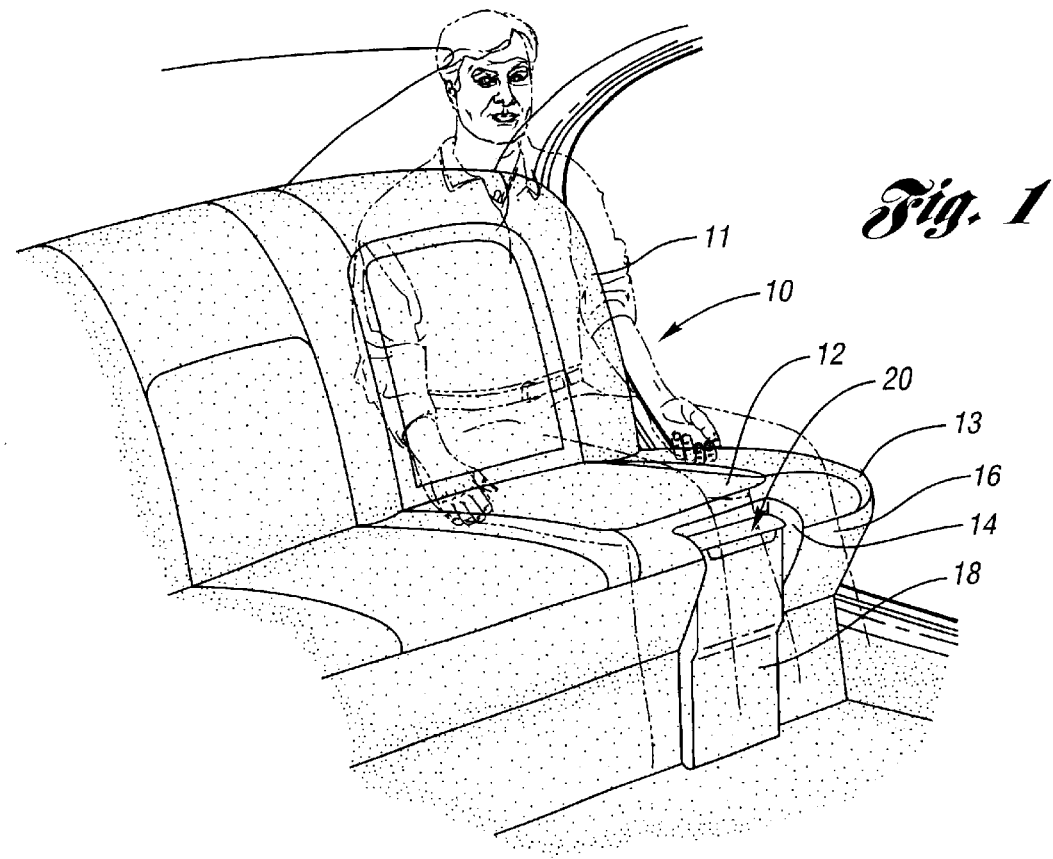
FIG. 1 shows a perspective view of a rear seat assembly in accordance with the present invention, with the tray in the stowed position.

Referring to FIGS. 1–4, the seat assembly 10 includes a seat back 11 (or backrest) and a lower seat 13 (or bench), and also includes a "40% percent portion" 12. The "40% portion" represents 40% of the width of the entire rear seat assembly, and is approximately the space required for one seated passenger. A recess 14 is formed on the forward side 16 of the 40% portion 12 of the lower seat cushion. The recess 14 is preferably positioned in the center of the 40% portion 12 so that it is positioned underneath and between the knees of a passenger seated thereon. A housing 18 is positioned within the recess 14, and configured such that it does not interfere with the knee space of the vehicle occupant seated on the 40% portion 12.

Figure 2:
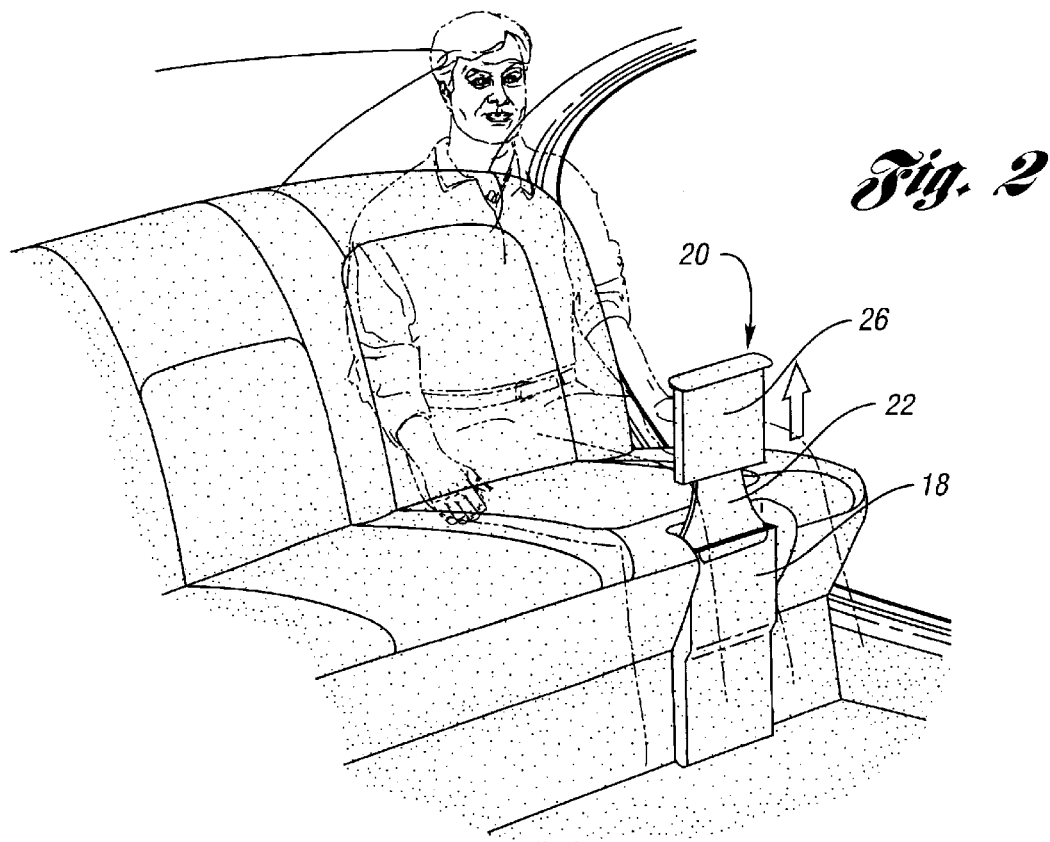
FIG. 2 shows a perspective view of the rear seat assembly of FIG. 1, with the tray assembly being deployed toward the use position.
Figure 3:
FIG. 3 shows a perspective view of the rear seat assembly of FIG. 2, with the tray stack pivoted to a table position from the position shown in FIG. 3.

As shown in FIGS. 2–3, a base portion 22 is vertically slidable with respect to the housing 18 to an upright position, shown in FIG. 3. By virtue of structure within the housing 18, the vertical position of the base portion 22 is adjustable for vertically adjusting the position of the tray assembly 20.

Figure 4:
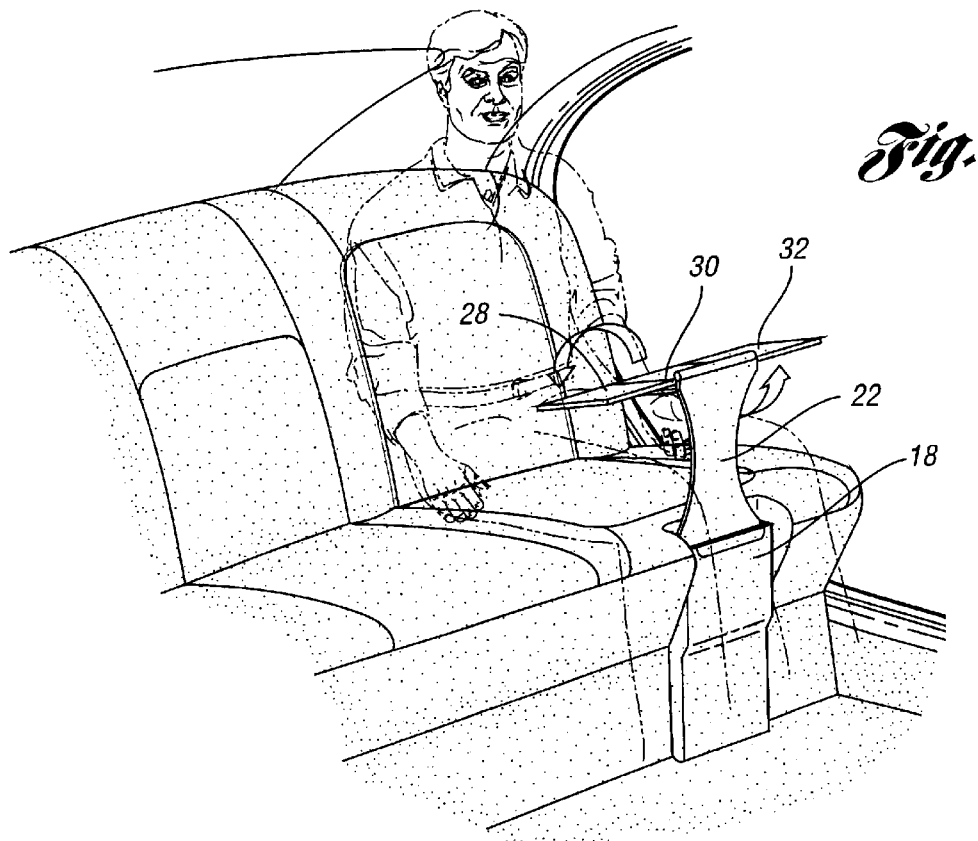
FIG. 4 shows a perspective view of the seat assembly of FIG. 3, with the foldable tray deployed to the use position.

As further shown in FIGS. 2 and 3, a tray stack 26 is pivotally movable between the stowed upright position, shown in FIG. 2, and the generally horizontal deployed position, shown in FIG. 3. As shown in FIG. 4, the tray stack 26 includes individual tray components 28, 30, 32 which are pivotable for deployment to the horizontal use position, as illustrated in FIG. 4.

This assembly provides a convenient stowable work surface for rear seat passengers without degrading knee space. The assembly would preferably comprise plastic components, and would be operable by one hand of a passenger. When stowed, it does not interfere with passenger comfort. It provides a comfortable and stable work surface for reading, writing, coloring, games, laptop use, etc. The work surface could be made of a smooth non-slip material. Also, an integrated cupholder could be provided with the assembly as well as a flexible reading lamp.

While the best mode for carrying out the invention has been described in detail, those familiar with the art to which this invention relates will recognize various alternative designs and embodiments for practicing the invention without department from the spirit and scope of the appended claims.

What is claimed is:

1. A vehicle seat assembly comprising:
   a rear seat having a vertically oriented recess formed at a forward side thereof;
   a tray housing positioned in said recess; and
   a foldable tray positioned in said housing and movable between a stowed position within the housing and a deployed position for use, wherein said tray and tray housing are configured such that in the stowed position the tray and housing are disposed within the seat recess below the knees of a passenger seated thereon such that the tray and tray housing do not interfere with passenger knee space, and in the deployed position the tray extends upward between the knees of the seated passenger.

2. The vehicle seat assembly of claim 1, wherein said tray housing is positioned at the center of a 40 percent position of said rear seat, such that, in the deployed position, the foldable tray extends upwardly between the knees of the seated passenger.

3. The vehicle seat assembly of claim 2, wherein said foldable tray includes a base portion which is vertically slidable with respect to the tray housing and a tray stack pivotally connected to the base portion for pivotal movement between a first position parallel with the base portion and a $2^{nd}$ position perpendicular to the base portion for use as a tray.

4. The vehicle seat assembly of claim 3, wherein said tray stack includes individual tray components which are pivotable for deployment to a horizontal use position.

5. A vehicle seat assembly comprising:

a rear seat having a vertical oriented recess formed at a forward side thereof; and a foldable tray positioned in said recess and movable between a stowed position and a deployed position for use, wherein said tray is configured such that in the stowed position the tray is disposed within the seat recess below the knees of a passenger seated thereon so that it does not interfere with passenger knee space, and in the deployed position the tray extends upward between the knees of the seated passenger.

6. The vehicle seat assembly of claim 5, further comprising a tray housing positioned in said recess for enclosing the foldable tray when in the stowed position.

7. The vehicle seat assembly of claim 6, wherein said tray housing is positioned at the center of a 40 percent position of said rear seat, such that, in the deployed position, the foldable tray extends upward between the knees of the seated passenger.

8. The vehicle seat assembly comprising:

a rear seat having a recess formed at a forward side thereof; and a foldable tray positioned in said recess and movable between a stowed position and a deployed position for use, wherein said tray is configured such that in the stowed position the tray is disposed within the seat recess below the knees of a passenger seated thereon so that it does not interfere with passenger knee space, and in the deployed position the tray extends upward between the knees of the seated passenger;

a tray housing positioned in said recess for enclosing the foldable tray when in the stowed position; and wherein said tray housing is positioned at the center of a 40 percent position of said rear seat, such that, in the deployed position, the foldable tray extends upward between the knees of the seated passenger; and wherein said foldable tray includes a base portion which is vertically slidable with respect to the tray housing and a tray stack pivotally connected to the base portion for pivotal movement between a first position parallel with the base portion and a second position perpendicular to the base portion for use as a tray.

9. The vehicle seat assembly of claim 8, wherein said tray stack includes individual tray components which are pivotable for deployment to a horizontal use position.

10. A vehicle seat assembly comprising:

a rear seat including a seat back and a lower seat having a vertically oriented recess formed at a forward side of the lower seat;

a tray housing positioned in said recess; and a foldable tray positioned in said housing and movable between a stowed position within the housing and a deployed position for use, wherein said tray and tray housing are configured such that in the stowed position the tray and tray housing are disposed within the seat recess below the knees of a passenger seated thereon such that the tray and tray housing do not interfere with passenger knee space, and in the deployed position the tray extends upward between the knees of the seated passenger.

* * * * *